US008278581B2

(12) United States Patent
Coffelt et al.

(10) Patent No.: US 8,278,581 B2
(45) Date of Patent: Oct. 2, 2012

(54) TRANSPORTING AND PACKAGING DEVICE AND METHOD OF USE

(75) Inventors: David J. Coffelt, Owego, NY (US); Barton Varney, Binghamton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 472 days.

(21) Appl. No.: 12/269,269

(22) Filed: Nov. 12, 2008

(65) Prior Publication Data

US 2009/0277756 A1 Nov. 12, 2009

Related U.S. Application Data

(62) Division of application No. 11/028,643, filed on Jan. 5, 2005, now Pat. No. 7,464,822.

(51) Int. Cl.
*G06K 9/00* (2006.01)

(52) U.S. Cl. ................... 209/584; 198/350; 198/370.03; 414/285; 414/790

(58) Field of Classification Search .................. 209/547, 209/584; 198/350, 370.03, 370.05, 408, 198/704; 414/285, 790.09; 248/441.1
See application file for complete search history.

(56) References Cited

U.S. PATENT DOCUMENTS

| | | | | | |
|---|---|---|---|---|---|
| 489,074 | A | * | 1/1893 | Edwards | 281/48 |
| 3,129,824 | A | | 4/1964 | Levy et al. | |
| 4,171,854 | A | * | 10/1979 | Hedstrom et al. | 312/184 |
| 4,509,635 | A | | 4/1985 | Emsley et al. | |
| 4,874,281 | A | | 10/1989 | Bergerioux et al. | |
| 5,096,047 | A | | 3/1992 | Morikiyo et al. | |
| 5,346,052 | A | | 9/1994 | Fox | |
| 5,570,773 | A | | 11/1996 | Bonnet | |
| 5,638,941 | A | * | 6/1997 | Oppliger et al. | 198/576 |
| 5,653,327 | A | | 8/1997 | Buday, Jr. et al. | |
| 5,938,241 | A | * | 8/1999 | Wilson | 281/36 |
| 5,994,657 | A | | 11/1999 | Maier et al. | |
| 6,095,315 | A | | 8/2000 | Andersch et al. | |
| 6,126,017 | A | | 10/2000 | Hours | |
| 6,208,908 | B1 | | 3/2001 | Boyd et al. | |
| 6,267,236 | B1 | * | 7/2001 | Seok | 206/320 |
| 6,286,662 | B1 | | 9/2001 | Meier | |
| 6,315,101 | B1 | | 11/2001 | Hugon | |
| 6,364,090 | B1 | | 4/2002 | Wild et al. | |
| 6,394,449 | B1 | | 5/2002 | Reist | |
| 6,422,375 | B1 | | 7/2002 | Hellman et al. | |
| 6,523,675 | B1 | | 2/2003 | Romeder | |
| 6,747,231 | B1 | * | 6/2004 | Bretschneider et al. | 209/584 |
| 6,979,793 | B2 | | 12/2005 | Shiibashi et al. | |
| 7,112,756 | B2 | | 9/2006 | Hanson | |
| 7,138,596 | B2 | * | 11/2006 | Pippin et al. | 209/584 |
| 7,235,756 | B2 | * | 6/2007 | De Leo et al. | 209/584 |
| 7,547,174 | B1 | * | 6/2009 | Pippin et al. | 414/280 |
| 7,728,244 | B2 | * | 6/2010 | De Leo et al. | 209/583 |
| 2003/0038065 | A1 | * | 2/2003 | Pippin et al. | 209/584 |
| 2003/0209473 | A1 | | 11/2003 | Brinkley et al. | |

(Continued)

*Primary Examiner* — Terrell Matthews

(74) *Attorney, Agent, or Firm* — Marcus P. Efthimiou; Andrew M. Calderon; Roberts Mlotkowski Safran & Cole, P.C.

(57) ABSTRACT

A system and method designed to transport and package sequenced product. The system includes a first transport system for receiving and transporting, in a closed position, holders each of which contain product. A second transport system transports, in the closed position, the holders until each of the holders are aligned within a respective release position, at which operational stage the second transport system is capable of opening the holders to discharge the product in a sequenced order. A packager receives the discharged product and packages the product in the sequenced order.

17 Claims, 7 Drawing Sheets

U.S. PATENT DOCUMENTS

2005/0067331 A1* 3/2005 De Leo et al. ................ 209/584
2005/0103597 A1* 5/2005 Scarnera .................. 198/370.01
2007/0226156 A1* 9/2007 De Leo et al. ................ 705/406

* cited by examiner

TRANSPORTING AND PACKAGING DEVICE AND METHOD OF USE

CROSS REFERENCE TO RELATED APPLICATIONS

The present invention is a divisional application of application Ser. No. 11/028,643, filed on Jan. 5, 2005 now U.S. Pat. No. 7,464,822, the contents of which are incorporated herein by reference in its entirety.

FIELD OF THE INVENTION

The invention generally relates to a transporting device and, more particularly, to a delivery point transporting and packaging device which is capable of transporting and packaging pre-sequenced product and a method of use.

BACKGROUND DESCRIPTION

The sorting of mail is a very complex, time consuming task. In general, the sorting of mail is processed though many stages, including back end processes, which sort or sequence the mail in delivery order sequence. These processes can either be manual or automated, depending on the mail sorting facility, the type of mail to be sorted such as packages, flats, letters and the like. A host of other factors may also contribute to the automation of the mail sorting, from budgetary concerns to modernization initiatives to access to appropriate technologies to a host of other factors.

In general, however, most modern facilities have taken major steps toward automation by the implementation of a number of technologies. These technologies include, amongst others, letter sorters, parcel sorters, advanced tray conveyors, flat sorters and the like. As a result of these developments, postal facilities have become quite automated over the years, considerably reducing overhead costs and increasing mail throughput.

By way of example, in front end processes, sorting and sequencing systems are capable of sequencing mail pieces and other products based on a two pass algorithm system. Of course, other known systems can equally be used to sort mail pieces and other products, a host of them readily available and known to those of ordinary skill in the art. In one such known system, sorting devices include one or more feeders with feed rate capacities ranging from approximately 40,000 letters per hour and approximately 10,000 flats per hour.

As the mail pieces are inducted into the system, they may be fed onto conveying tracks such as belt transports, pocket/cartridge transports or any other well known conveying or transporting system. The mail process or other items then pass a camera, optical reading device, bar code scanner or other type of reading device used to read destination information from the mail pieces. This information is then provided to a control, which uses such information to coordinate the movements of the mail pieces to predetermined bin locations, via diverters or other known systems. In a two pass system, the mail pieces and other products are now in a sort order.

However, to place the mail pieces in a walk order sequence, for example, the mail pieces are again inducted into the system for a second pass. During this second pass, the destination information is again read and provided to the control. With this information, the control can then coordinate the movements of the mail pieces to respective bin locations. It is during this second pass, that the mail pieces are then provided in a sequenced stream, e.g., walk order sequence.

During this sequencing, the mail pieces or other product are initially unloaded to containers located at each drop off point, via chutes. In this manner, the mail pieces are slid down the chutes into the containers and are stacked within the containers in a sequenced order. Although the mail pieces are provided within the containers in a delivery order sequence, there is a tendency that the mail pieces, after being placed within the containers, lose their sequence integrity. This is basically due to the fact that the mail pieces are stacked within the containers, themselves, without being encapsulated, packaged or otherwise segregated from other delivery addresses. So, in the containers, the mail pieces can shift out of sequence with respect to one another, especially during the transporting of the mail pieces by the mail carrier during the delivery of such mail pieces.

If the mail pieces lose their sequence integrity, it becomes much more time consuming for the mail carrier to properly delivery the mail pieces. And, in instances, the mail pieces may have to again be sequenced, but during the delivery process. This adds to the delivery time and, ultimately, the cost of delivery of the mail pieces. It also may lead to the improper delivery of the mail pieces or mail pieces being undeliverable.

Also, even if the mail pieces do not lose their sequence integrity, there is always the possibility that the mail carrier may improperly remove the mail pieces from the containers. For example, because the mail is not bound, in any way, the mail carrier can easily remove mail pieces for a different delivery address from the container. This may result in the improper delivery of the mail to a particular delivery address.

To complicate these problems, in some systems, flats and other types of mail pieces are sequenced separately due to the limitations of the sorting systems. In these situations, the sequenced mail pieces and flats are provided in different containers. For this reason, it becomes very difficult and time consuming for a mail carrier to separate and efficiently delivery the combined mail, when the mail pieces and flats are provided in separate containers, possibly out of sequence for the reasons enumerated above.

The invention is directed to overcoming one or more of the problems as set forth above.

SUMMARY OF THE INVENTION

In a first aspect of the invention, a system transports and packages sequenced product. The system includes a first transport system for receiving and transporting, in a closed position, holders each of which contain product. A second transport system transports, in the closed position, the holders until each of the holders are aligned within a respective release position, at which operational stage the second transport system is capable of opening the holders to discharge the product in a sequenced order. A packager receives the discharged product and packages the product in the sequenced order.

In a second aspect of the invention, the system includes a transport system comprising a gripping mechanism controllable to:

- hold holders in a closed position until each of the holders are aligned within a respective release position;
- open the holders when aligned with the respective release position in order to discharge product contained therein in a sequenced order; and
- release the holders from the transport system at an operational stage after the discharge of the product. The system further includes at least one packager which receives the discharged product and packages the product in the sequenced order.

In another aspect of the invention, a method includes the steps of transporting product for each delivery point in a respective closed holder from a conveying system to a respective release position associated with a packager. The product is discharged, in sequence of walk order delivery, from the respective holder and transported in the sequence of walk order delivery to a respective packager, for at least a segment of the delivery route. The product is packaged for each delivery point into one package and discharged in the sequence of walk order delivery.

In yet another aspect of the invention, a holder is adapted for use in a transporting device. The holder includes a first section hinged mounted to a second section, and a spring biasing the first section away from the second section such that, in a first state, the first section is remotely positioned from the second section.

BRIEF DESCRIPTION OF THE DRAWINGS

The foregoing and other objects, aspects and advantages will be better understood from the following detailed description of embodiments of the invention with reference to the drawings, in which.

DETAILED DESCRIPTION OF EMBODIMENTS OF THE INVENTION

The invention is directed to a delivery point transporting and packaging system and related components designed to package pre-sequenced products such as mail pieces, flats and other mail items (product). The delivery point transporting and packaging system of the invention is a back end processing system and method of use, utilized preferably after sorting and/or sequencing of the product. In aspects of the invention, the product may be packaged into separate deliverable packages at a downstream point, after the sequencing of such products using different systems. The system and method of the invention significantly reduces processing times for packaging all types of product, including both flats and mail pieces or other disparate products in delivery point sequence. Other applications such as warehousing and storage applications are also contemplated for use with the invention.

System of the Invention

Figure 1:
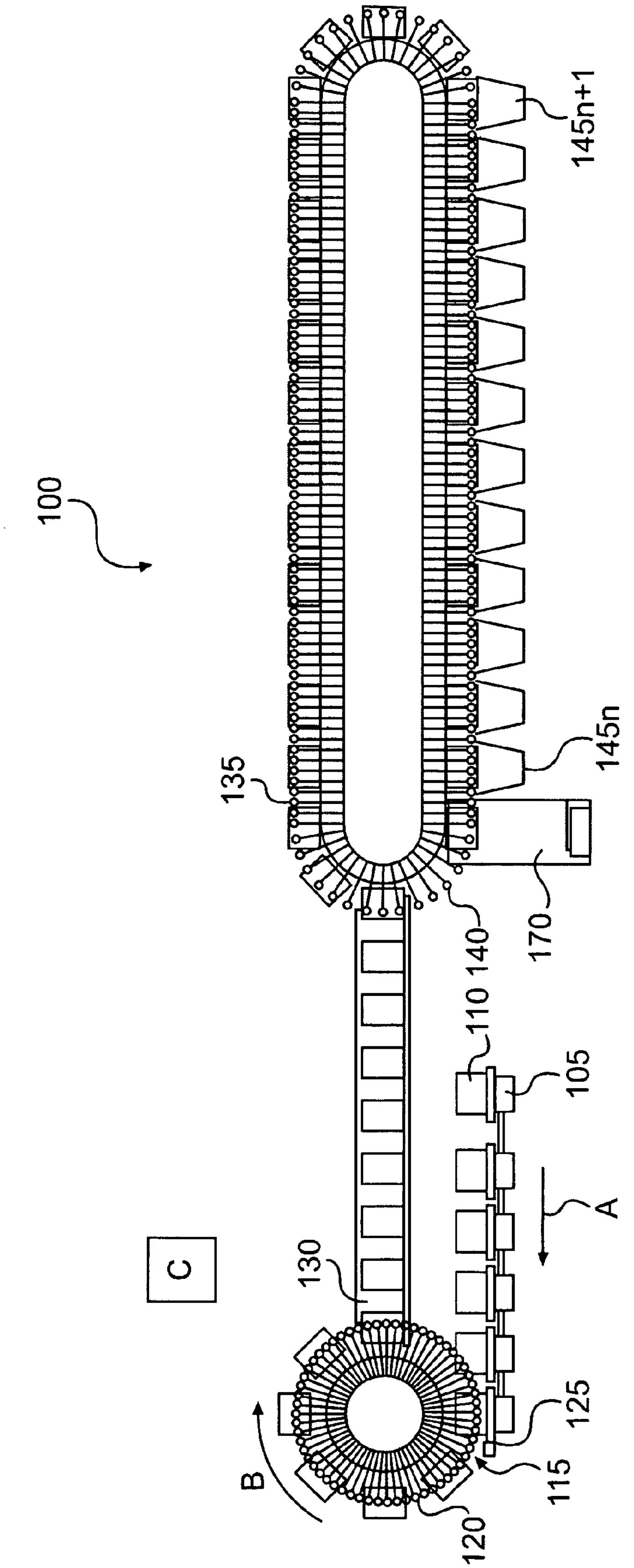
FIG. 1 shows a schematic diagram of the device of the invention.

Referring now to FIG. 1, a schematic diagram of the delivery point transporting and packaging system (hereinafter referred to as the system) is shown. In the embodiment of FIG. 1, the system is generally depicted as reference numeral 100 and includes a transport belt 105 designed to transport mail holders 110 between a sorting/sequencing system (not shown) and a transporting device 115. The mail holders 110, in one implementation, each hold a sequenced set of product for a single delivery destination.

In one aspect of the invention, the transporting device 115 may rotate in direction "B", and further elevate the holders 110 from a first level to a second level. The transporting device 115 may include a plurality of gripping mechanisms 120, each controllable by a cam mechanism, pneumatic device, rack and pinion system, motor or other conventional mechanism. The gripping mechanism may include, for example, downward extending fingers designed to hold and release the holders 110, as described below. The use of the pneumatic device, rack and pinion system, motor or other conventional mechanism may be coordinated to hold and release the holders 110, using controller "C".

Figure 2A:
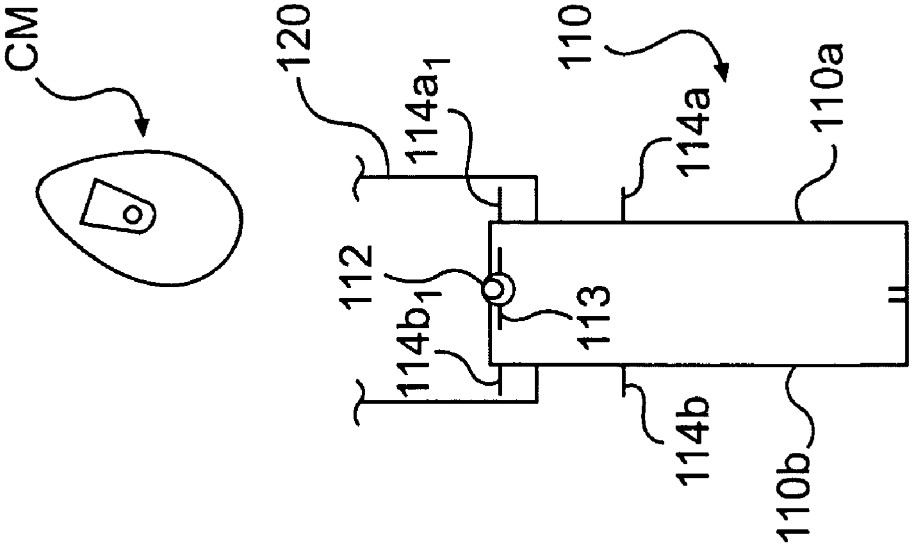
FIG. 2*a* shows a subsystem in a first operation stage in accordance with the invention.
Figure 2B:
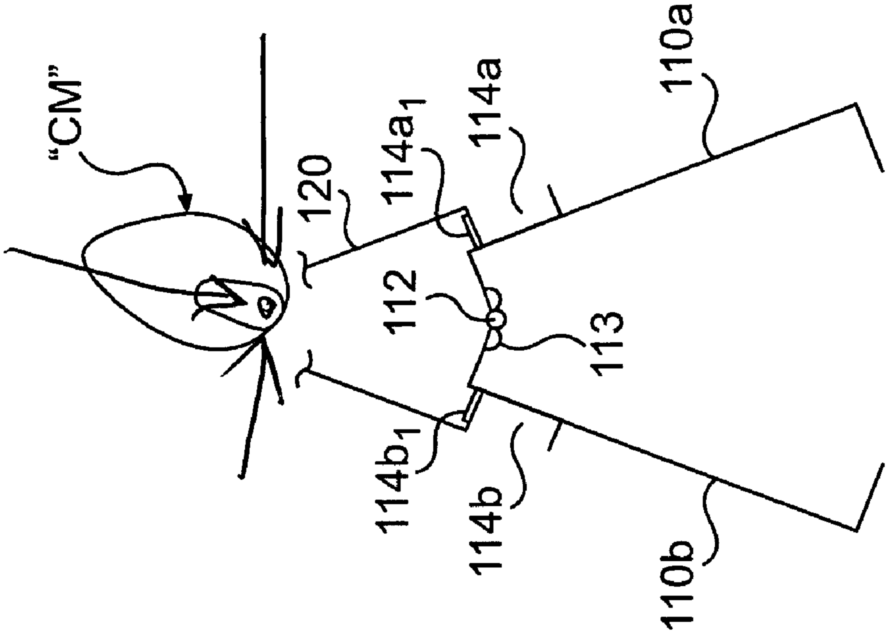
FIG. 2*b* shows a subsystem in a second operation stage in accordance with the invention.
Figure 3D:
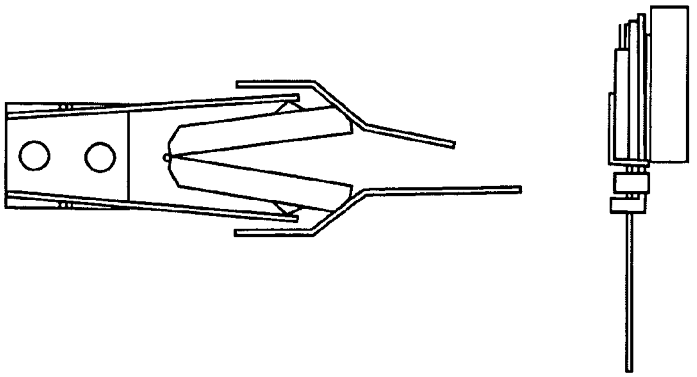
FIGS. 3A-3G show a subsystem and processing sequence in accordance with the invention.
Figure 3C:
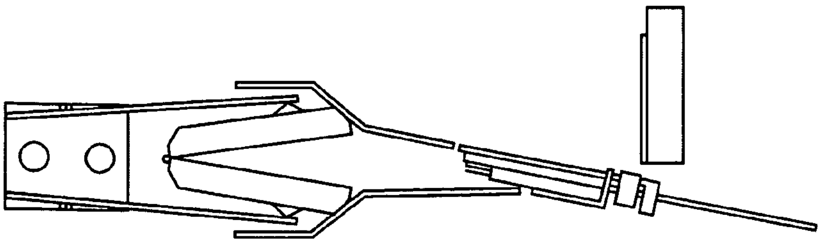
Figure 3B:
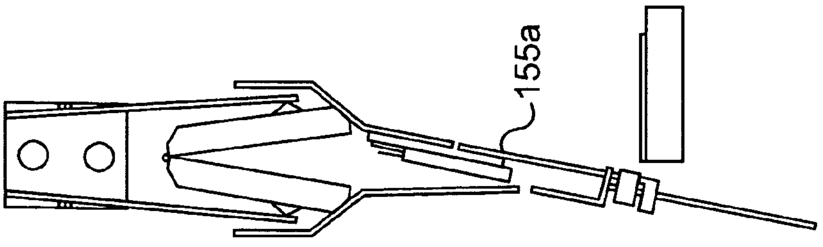
Figure 3A:
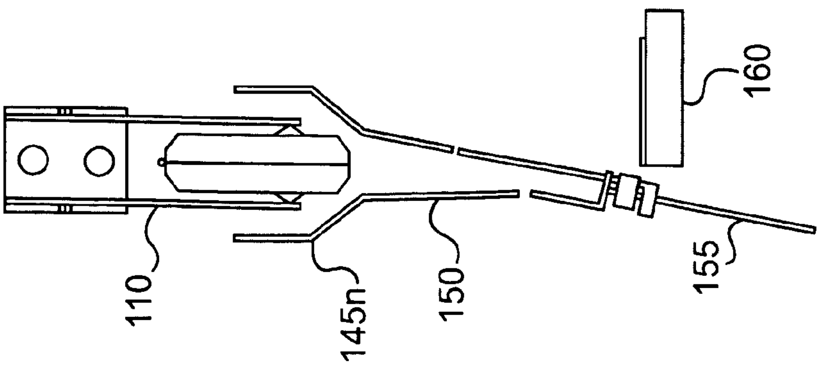
Figure 3G:
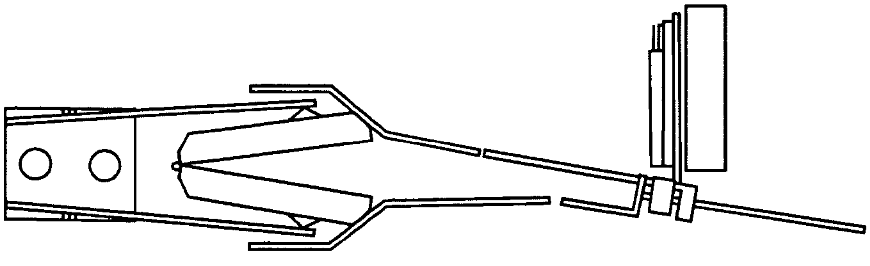
Figure 3F:
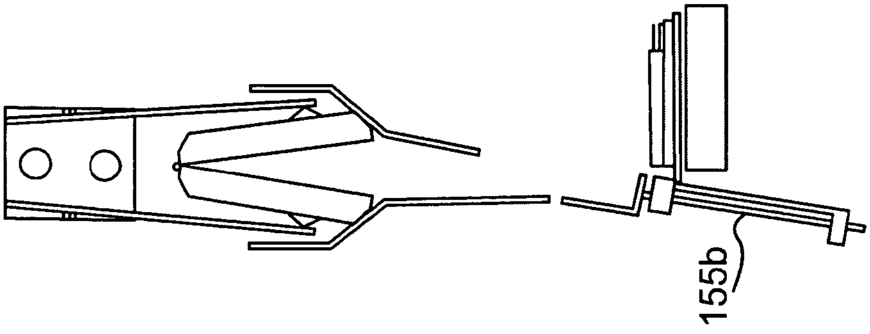
Figure 3E:
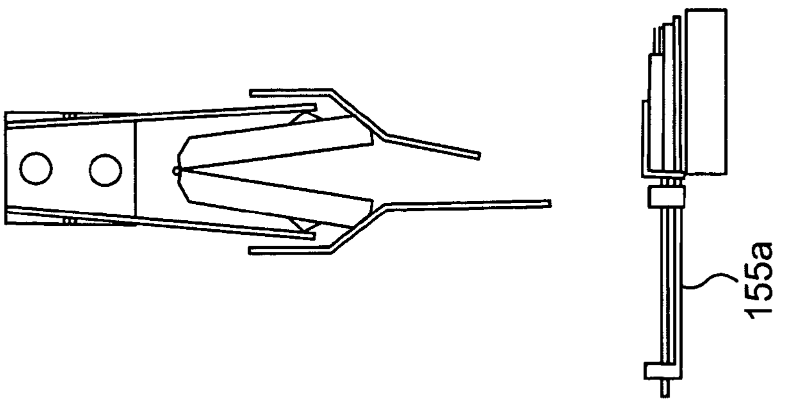

In one implementation, a cam mechanism (as shown in FIGS. 2*a* and 2*b*, represented as "CM") is operable to open and close the gripping mechanism such as, a pair of downward extending fingers, based on a rotational position of the transporting device 115. For example, as the gripping mechanism nears the mail holders 110 on the transport belt 105, the pair of downward extending fingers will begin to close and eventually clasp onto the mail holders 110. As the transporting device 115 rotates in direction B, the fingers will remain closed until in the approximate vicinity of a pair of squeeze belts 130. As the gripping mechanism passes the squeeze belts, the gripping mechanism 120 will release the holder 110 and drop it into the squeeze belts 130. The squeeze belts 130 may be any conventional belt system arranged in parallel and separated by a predetermined distance. The holders will remain in a closed position in the squeeze belts.

A camera, optical reading device, bar code scanner or other type of reading device 125 may be provided downstream of the transporting device 115. In embodiments of the invention, the reading device 125 may be located at any convenient position within the system 100, prior to an unloading position. In embodiments, the reading device 125 is designed to read pertinent information provided on the holders which are already associated with the product therein.

By way of illustrative example, at the sorting/sequencing system, product may be placed into each of the holders, at which time the controller "C" will associate such product with the respective holder. As the holder passes the reading device 125, the reading device 125 will read the pertinent holder information, and provide such information to the controller "C". The controller "C" will then reconcile such information with the known contents of the holder. In this manner, the system 100 may maintain track of the holders and their contents at any stage of operation. In another implementation, the controller may maintain positional information of the holders throughout the entire system, based on logic, without the need for the reading devices.

Once the holders 110 are released into the squeeze belts 130, the holders 110 are then transported to a second transporting device 135. The squeeze belt maintains the holders in a closed position to ensure that the product remains within the holder during this operational stage. The second transport device 135 includes a gripping mechanism 140, similar to that described with reference to gripping mechanism 120. In particular, the gripping mechanism 135 may include fingers which hold the holders in a closed position as well as releasing the holders from the system 100. In addition, the gripping mechanism 140 is further designed, at appropriate positions within the system, to open the holders to release the contents therein. The gripping mechanism 140 may be operable by a cam mechanism, a pneumatic device, rack and pinion geared system, motor or other conventional mechanism.

The gripping mechanism 140 is designed to allow the holders to open at appropriate drop-off or release positions 145_n_ . . . 145_n_+1, coordinated by the controller "C". In this manner, product within the holders may be released from the holders, in a delivery point order (e.g., sequence) for packaging, in accordance with the invention and as discussed in more detail below. The gripping mechanism 140 may additionally release the holders 110 at a takeaway conveyor 170, positioned at a back end of the system 100. The takeaway conveyor 170 is preferably a squeeze belt conveyor.

FIG. 2_a_ shows an exploded view of a holder 110 in a closed position. The holder 110 includes two halves 110_a_ and 110_b_, preferably connected by a hinge 112. To openly bias the halves 110_a_ and 110_b_, a spring 113 such as a coil or leave spring is provided between the two halves 110_a_ and 110_b_. A boss, platform, C-shaped bracket or other such engaging mechanism such as, for example, a detent or groove, is provided on the outer surfaces of each of the halves 110_a_ and 110_b_, as generally denoted by reference numerals 114_a_ and 114_b_.

In operation, the gripping mechanism will attach to the mechanism 114_a_ and 114_b_. In the fully closed position, the gripping mechanism will bias the halves 110_a_ and 110_b_ together in order to ensure that product remains within the holder 110 during transport. That is, in this operational stage, the force applied by the gripping mechanism to the holders will be greater than that of the spring force. The two halves will form a receptacle in this state.

To release product from the holders at the appropriate drop off positions 145_n_ . . . 145_n_+1, the gripping mechanism will open slightly such that the spring force will overcome any forces applied by the gripping mechanism; however, the holders 110 will remain attached to the gripping mechanism by an upper ledge $\mathbf{114}a_1$ and $\mathbf{114}b_1$ of the mechanisms 114_a_ and 114_b_. This is shown in FIG. 2_b_, for example. FIGS. 2_a_ and 2_b_ also show the cam mechanism "CM" used for controlling the force applied by the gripping mechanism to the holders (for opening and closing the holders).

FIGS. 3A-3G show operational stages 3A-3G of operations using a subsystem of the invention. In accordance with FIGS. 3A-3G, the holder 110 is aligned with a drop off position 145_n_, which corresponds to a delivery address. The drop off position 145 includes a discharge chute 150 in alignment with a holder 155. The different operational stages shown in FIGS. 3A-3G may be coordinated by the controller "C", as with the other subsystems of the invention. Also, the holders 155 and related subsystems may be moved into any of the sequenced positions by pneumatics, motors, springs or other known mechanism, as should be readily recognized by those of ordinary skill in the art.

Figure 4:
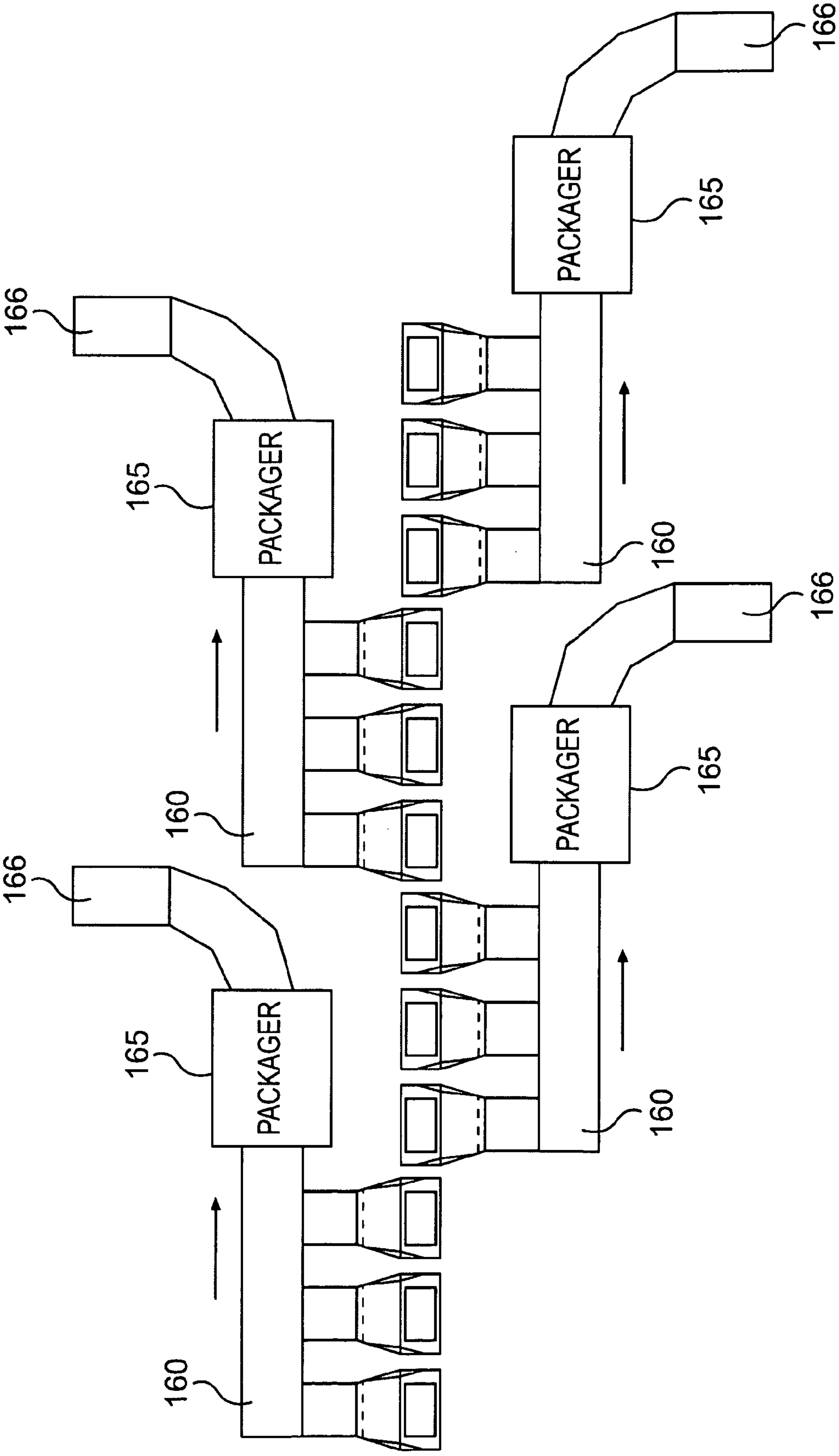
FIG. 4 shows a subsystem in accordance with the invention.

In operational stage 3A, the holder 110 is placed in alignment with the discharge chute 150. Once in alignment, in operational stage 3B, the holder 110 is partially opened as discussed with reference to FIG. 2_b_ such that the product slides within the discharge chute 150. In operational stage 3C, the product enters into the holder 155, and in operational stage 3D, the holder 155 positions itself flat on a conveyor 160 (e.g., flat belt, rollers etc.), leading to a packager (FIG. 4). In this operational stage, the product remains positioned on a bottom portion 155_a_ (e.g., fingers) of the holder 155.

In operational stage 3E, the bottom portion 155_a_ of the holder is retracted, via any known mechanism such as, for example, a pneumatic or hydraulic piston, linear motor, rack and pinion system or the like. As the bottom portion 155_a_ of the holder 155 is retracted, the product is positioned on the conveyor 160, itself, and can be transported to the packager. In operational stage 3F, the bottom portion 155_a_ and a connecting portion 155_b_ of the holder 155 is rotated downward and then the entire holder 155 is rotated back into alignment with the holder at operational stage 3G. The connecting portion is preferably attached to a control mechanism (not shown) for moving the holder 155 into the positions of operational stages 3A and 3D, for example. The process begins again with operational stage 3A.

FIG. 4 shows a plan view of a subsystem of the invention including a packager and discharge chutes. In one aspect of the invention, predetermined amounts of discharge chutes and drop off or release positions 145_n_ . . . 145_n_+1 may be associated with a predetermined number of packagers 165. For example, a packager may be associated with three drop off positions, as one illustration. As the product is discharged from the holders, and more particularly in sequence E or sequence F of FIGS. 3E and 3F, the product is fed into the respective packager 165 by the conveyors 160, in the direction of the respective arrows. The product is then packaged by the packager into bundles using for example, shrink warp, bands or the like. That is, the packager will package each delivery address or destination into a single package, under coordination of the controller "C".

In an embodiment, the packagers 165 package the product in delivery point sequence, in an attached stream of packets, enabling the mail carrier to simply detach each sequential packet at each destination. With the packages in guaranteed sequence, the effort required by the carrier at each delivery point is considerably reduced. The packagers 165 may perform the packaging of the product in parallel.

In another embodiment, the packagers 165 are located downstream from the sorting system, as well as downstream from the reading device. In embodiments, the packagers 165, working in conjunction with the sorting system, will collect all product having a same destination information (delivery point) or same product information into a package, up to a maximum total packet thickness. The maximum packet thickness may be based on the maximum thickness that can be transported in the holders, for example. The package is then transported to its destination and ejected as a single piece into a destination bin 166. In this embodiment, four (4) packagers are shown, with the understanding that more or less than this number of packagers can also be provided depending on the particular application of the invention. This implementation provides a significant total realized throughput increase.

Figure 5:
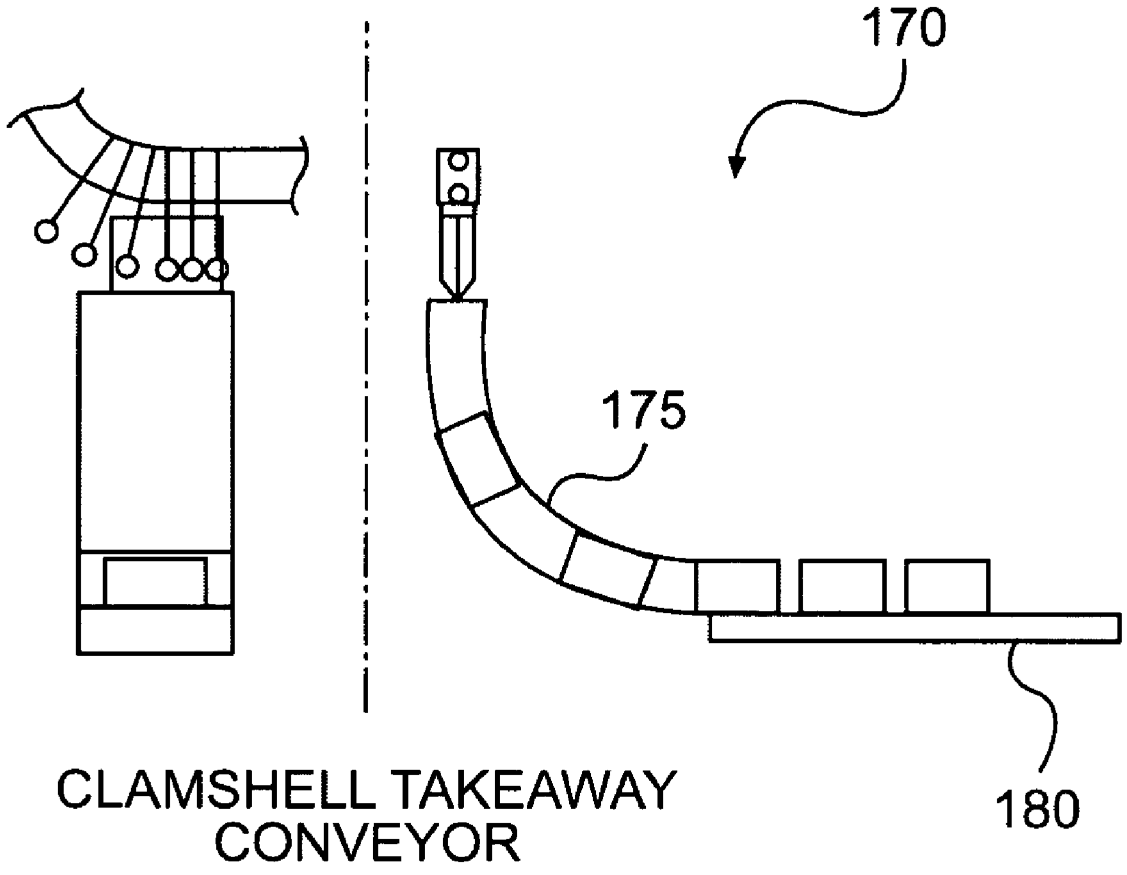
FIG. 5 shows a subsystem in accordance with the invention.

FIG. 5 shows the takeaway system of the invention. In this subcomponent, the holders 1 10 will be released by the gripping mechanism 140 into the takeaway system 170. In one aspect of the invention, the takeaway system 170 is a squeeze belt conveyor 175 which is capable maintaining a closes position of the holders at the time of release by the gripping mechanism 140. To release the holders from the gripping mechanism 140, the gripping mechanism 140 will open to such an extent that the upper ledge $\mathbf{114}a_1$ and $\mathbf{114}b_1$ of the mechanisms 114_a_ and 114_b_ (on the holders) will no longer rest on the fingers of the gripping mechanism 140. The holders 110 will then be transported to the sorting system or other location, via a conventional transporting system such as a belt conveyor 180.

Method of Transporting and Packaging Product Using the System of the Invention

The system of the invention may be used for a single carrier route at a time, multiple routes at once or for warehousing or other sequencing needs of pre-sequenced products. For illustrative purposes and not to limit the invention in any manner, a single route sequencing implementation will be described as an illustrative example. For a single route, the optimum number of packagers to be operated in parallel can be derived based on the following assumptions for this illustrative example:

1. An average route of 650 stops (delivery points) with 4000 letters and 1000 flats.
2. Four (4) letters are packaged in each packet. This translates into processing letters for 10,000 packets per hour with a letter feeder running at 40,000 letters per hour. The time duration for processing 4000 letters into 1000 packets is 1/10 hour=6 minutes.
3. The flat feeder runs at 10,000 pieces per hour. The time duration for processing 1000 flats is 1/10 hour=6 minutes. Using these examples as an illustration, the sort of an entire route or other purpose takes approximately 12 minutes or less. (If flats and letter packets alternate, the system of the invention can be adjusted to sort at a significantly higher rate.) Those of ordinary skill in the art may also implement these calculations for other applications. Given then that the illustrative route takes approximately 12 minutes to sort, it would be ideal to have enough parallel operating packagers to package at the rate of sorting, which may be five packagers.

Figure 6:
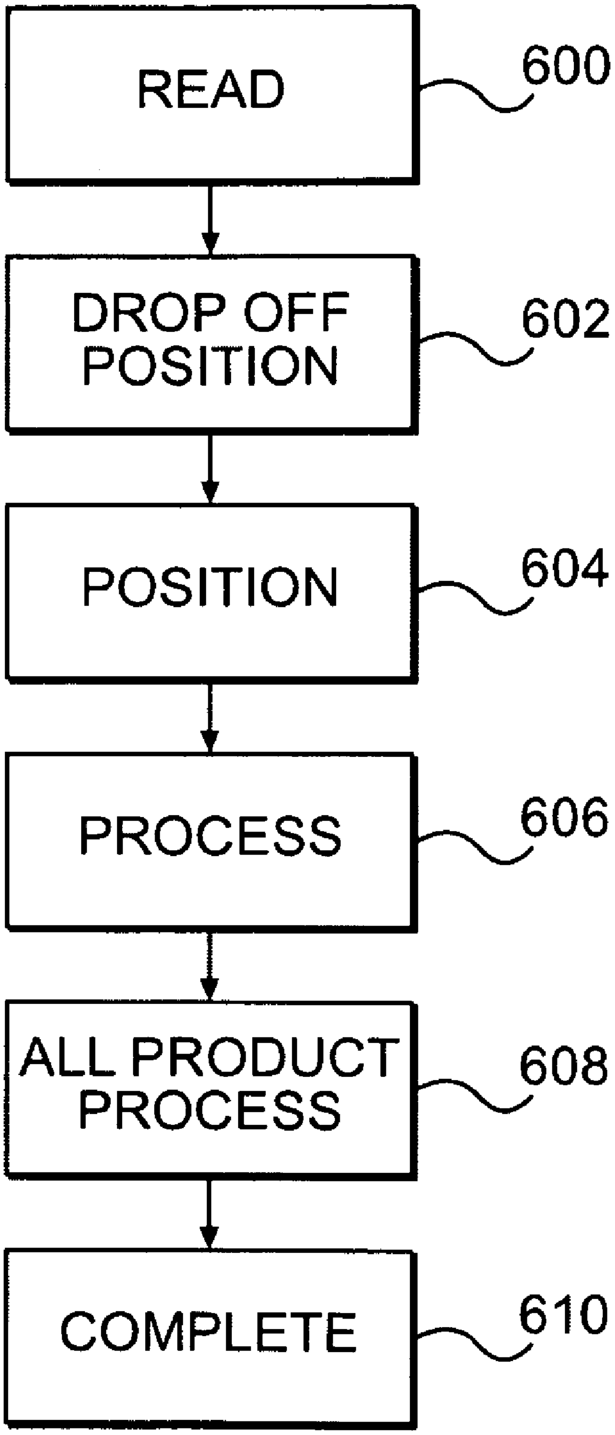
FIG. 6 is a flow diagram showing steps implementing the method of the invention.

FIG. 6 is a flow diagram showing the steps of implementing the method of the present invention. The steps of the invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). FIG. 6 may equally represent a high level block diagram of the system of the present invention, implementing the steps thereof.

In particular, in step 600, in one aspect of the invention, the reading device reads the information of the holders and provides such information to the controller "C". The controller "C" is then able to reconcile each holder with the product contained within each holder. This is accomplished by (i) obtaining the information of the product prior to placing the product in each holder and (ii) recognizing which holder is holding such product.

In step 602, a determination is made as to which drop off position the holder should release product therein. This determination is made on the assumption that each holder holds a single delivery destination and the product in each holder is to be packaged in a sequence of delivery destinations (walk order sequence) with respect to other product in other holders. Several holders may drop product simultaneously, resulting in increased throughput of the system.

Once this determination is made, the holders are positioned over the respective drop off position, at step 604, and opened in order to release the product to the packager. The opening of the holders is sequenced to provide the product to the packager in a sequenced order for at least a segment of the delivery route. The product is then processed through to the packagers in the sequential order such that each delivery point can be packaged separately (step 606). In this manner, product with the same delivery point information is provided in a single package.

In step 608, a determination is made as to whether product for the route has been processed by the invention. If yes, then, in step 610, the packages of products for that delivery sequence or a segment of that delivery sequence is completed. However, if there is additional product for the delivery sequence, then the system continues, as above. In embodiments of the invention, the packagers will package the products having the same delivery point for each of their route segments in parallel. The packages are discharged from the system in a sequence of walk order for the delivery route.

While the invention has been described in terms of embodiments, those skilled in the art will recognize that the invention can be practiced with modification within the spirit and scope of the appended claims.

What is claimed:

1. A holder for use in a transporting device, comprising a first section hinged mounted to a second section, and a spring located between the first section and the second section biasing the first section away from the second section such that, in a first state, the first section is remotely positioned from the second section.

2. The holder of claim 1, wherein the spring is a coil spring or leaf spring provided between the first section and the second section.

3. The holder of claim 1, further comprising an engaging mechanism provided on outer surfaces of each of the first section and the second section.

4. The holder of claim 3, wherein the engaging mechanism is one of a detent, groove, and bracket having an upper member extending outward from the outer surfaces.

5. The holder of claim 1, wherein, in a second state, the first section and the second section engage with one another forming receptacle therein for holding product.

6. A holder, comprising:

a first section;

a second section connected to the first section by a hinge;

a spring provided between the first section and the second section which is structured to bias the first section away from the second section; and an engaging mechanism provided on outer surfaces of each of the sections.

7. The holder of claim 6, wherein the spring is one of a coil and leaf spring.

8. A holder, comprising:

a first section;

a second section connected to the first section by a hinge;

a spring provided between the first section and the second section;

an engaging mechanism provided on outer surfaces of each of the sections; and a gripping mechanism that engages with the engaging mechanism, wherein the spring is one of a coil and leaf spring, and the engaging mechanism is one of a boss, platform, C-shaped bracket, detent and groove.

9. The holder of claim 8, wherein the spring has a spring force which is configured to bias the first section away from the second section.

10. A holder, comprising:

a first half hinge mounted to a second half, the first half and the second half forming an enclosure when in a closed position;

a spring positioned between the first half and the second half which has a spring force configured to bias the first half away from the second half thereby forming an opening between the first half and the second half; and an engaging mechanism provided on outer surfaces of the first half and the second half, wherein the engaging mechanism is a boss, platform, C-shaped bracket, detent or groove.

11. The holder of claim 10, wherein the spring is a leaf spring or a coil spring.

12. The holder of claim 10, further comprising a gripping mechanism that engages with the engaging mechanism.

13. The holder of claim 12, wherein the gripping mechanism has a force greater than the spring force to maintain the first half and the second half in the closed position.

14. The holder of claim 12, further comprising a cam mechanism structured to control the force applied by the gripping mechanism to the first half and the second half for opening and closing the first half and the second half.

15. The holder of claim 8, further comprising a cam mechanism structured to control a force applied by the gripping mechanism to the first section and the second section for opening and closing the first section and the second section.

16. The holder of claim 6, further comprising a gripping mechanism that engages with the engaging mechanism, and a cam mechanism structured to control a force applied by the gripping mechanism to the first section and the second section for opening and closing the first section and the second section.

17. The holder of claim 3, further comprising a gripping mechanism that engages with the engaging mechanism, and a cam mechanism structured to control a force applied by the gripping mechanism to the first section and the second section for opening and closing the first section and the second section.

* * * * *